US008810989B2

(12) United States Patent
Zhang et al.

(10) Patent No.: US 8,810,989 B2

(45) Date of Patent: Aug. 19, 2014

(54) DC PASS FILTER USING FLAT INDUCTOR IN CAVITY

(75) Inventors: Yunchi Zhang, Wallingford, CT (US); Yin-Shing Chong, Middletown, CT (US); Jari M. Taskila, Meriden, CT (US)

(73) Assignee: Alcatel Lucent, Boulogne-Billancourt (FR)

( * ) Notice: Subject to any disclaimer, the term of this patent is extended or adjusted under 35 U.S.C. 154(b) by 615 days.

(21) Appl. No.: 13/088,644

(22) Filed: Apr. 18, 2011

(65) Prior Publication Data

US 2012/0264486 A1 Oct. 18, 2012

(51) Int. Cl.
*H02H 9/00* (2006.01)

(52) U.S. Cl.
USPC .......... 361/118

(58) Field of Classification Search
USPC .......... 361/118
See application file for complete search history.

(56) References Cited

U.S. PATENT DOCUMENTS

| | | | | |
|---|---|---|---|---|
| 6,061,223 | A * | 5/2000 | Jones et al. | 361/119 |
| 7,623,332 | B2 * | 11/2009 | Frank et al. | 361/119 |
| 2006/0007625 | A1 * | 1/2006 | Harford | 361/118 |
| 2009/0309579 | A1 * | 12/2009 | Cochran | 324/207.16 |
| 2011/0080683 | A1 * | 4/2011 | Jones et al. | 361/113 |

* cited by examiner

*Primary Examiner* — Stephen W Jackson
(74) *Attorney, Agent, or Firm* — Kramer & Amado, P.C.

(57) ABSTRACT

Various embodiments relate to a base station element and related method of suppressing an alternating-current (AC) portion of a signal. A base station element includes a filter capable of lightning suppression through the use of an LC filter that suppresses an AC portion of a received signal while passing a DC portion of the signal. The LC filter includes a flat inductor disposed in a cavity of the base station. The flat inductor may be connected to other electrical components disposed in the cavity of the base station to complete the electrical circuit. In some embodiments, the flat inductor may be produced from one material through photo-etching and may also include snap in or snap on connectors on one or both ends to enable galvanic contact with other components like a tap pin or a printed circuit board (PCB) without requiring attachment through soldering.

20 Claims, 4 Drawing Sheets

DC PASS FILTER USING FLAT INDUCTOR IN CAVITY

TECHNICAL FIELD

Various exemplary embodiments disclosed herein relate generally to alternating-current (AC) suppression filters.

BACKGROUND

Lightning strikes have been a persistent problem for electrical devices, as lightning strikes produce electrical surges that may cause catastrophic damage to electronics. This results in cost not only to replace the damaged equipment, but also in the period that the electrical system is down due to the damaged component. Various solutions have been proposed to address this issue, whether they are devices and/or systems to specifically address lightning strikes, more comprehensive coverage for electrical surges, or foundational design strategies that emphasize proper grounding of electrical equipment.

SUMMARY

In view of the foregoing, it would be desirable to include a lightning suppression and surge protection solution in a communication base station. In particular, it would be desirable to include a lightning suppression or surge protection filter in a base station that allows the base station to operate at high power levels, for example over 200 W.

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in the later sections.

Various embodiments may relate to a base station element including: a housing forming a cavity; and a filter that receives a signal, suppresses an alternating-current (AC) portion of the signal and passes a direct-current (DC) portion of the signal, the filter comprising: a flat inductor disposed inside the cavity, and a tap pin disposed inside the cavity and connected to a first end of the flat inductor.

Various embodiments may also relate to a method of suppressing an alternating-current (AC) portion of a signal, the method including: providing a base station element comprising a housing forming a cavity; providing a filter comprising a flat inductor disposed inside the cavity, and a tap pin disposed inside the cavity and connected to a first end of the flat inductor; receiving, by the filter, the signal; suppressing, by the filter, the AC portion of the signal; and passing, by the filter, a direct-current (DC) portion of the signal.

It should be apparent that, in this manner, various exemplary embodiments enable a base station with an AC suppression filter. Particularly, by providing a filter with DC pass including a flat inductor, a cost-effective solution for lightning suppression and surge protection may be provided.

BRIEF DESCRIPTION OF THE DRAWINGS

In order to better understand various exemplary embodiments, reference is made to the accompanying drawings wherein.

DETAILED DESCRIPTION

Figure 1:
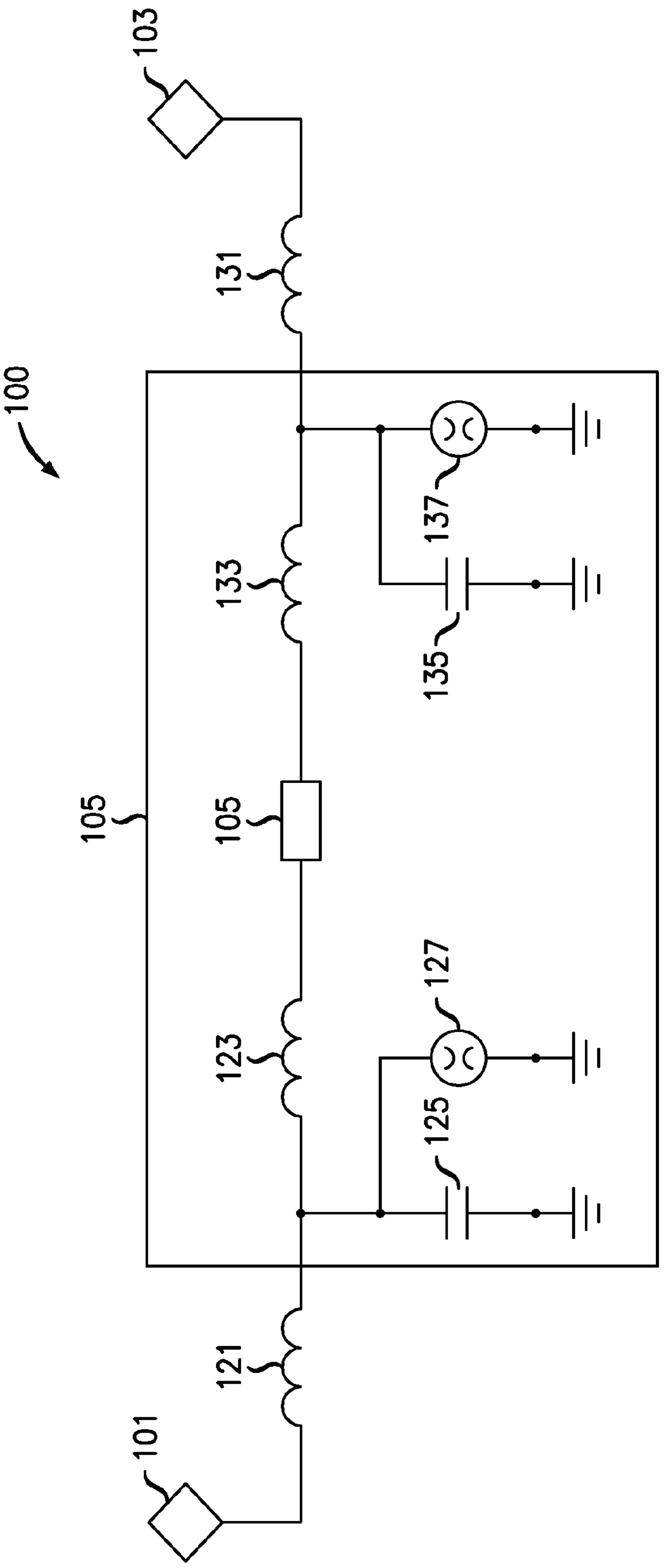
FIG. 1 illustrates an electrical schematic of an exemplary base station AC suppression filter.

Referring now to the drawings, in which like numerals refer to like components or steps, there are disclosed broad aspects of various exemplary embodiments.

A communication base station may be hardware that may house one or more components to enable communications with other devices in a wired or wireless communications network. The base station may also include other components for safety and maintenance, such as, for example, an AC-suppression filter that may be used for surge protection. The base station may be hardware connected to a wired and/or wireless communications system and may be configured to operate based on the protocol used within the communications system. The base station may be connected to one or more antennas, which may receive electromagnetic waves and convert the waves into signals. In some embodiments, the base station may include a transceiver. In such instances, the antenna may convert electrical signals to electromagnetic waves and may transmit the waves to other devices in the communications system. The base station may include a high power cavity filter that filters incoming RF signals. The cavity filter may include additional low power circuitry on a printed circuit board (PCB). The PCB is connected to the cavity filter via a tap. Because the base station is connected to an antenna, the base station may be susceptible to lighting strikes or other high power surges. Accordingly, the base station may include an AC suppression filter to provide protection from lightning and other high power surges. Further, the base station may include an auto-transformer.

FIG. 1 illustrates an electrical schematic of an exemplary base station AC suppression filter 100. The suppression filter 100 includes ports 101 and 103 that input and output signals from the suppression filter 100. Inductors 121 and 131 are flat inductors that will be discussed in more detail below. A printed circuit board (PCB) 105 is connected between the two inductors 121 and 131. The PCB includes inductors 123 and 133, transmission line 11, capacitors 124 and 135, and gas discharge tubes 127 and 137. The capacitor 125 and gas discharge tube 127 are connected in parallel between one end of the inductor 123 and ground. The gas discharge tube 127 protects the capacitor 125 in the case of a large transient current. In a like manner, the capacitor 135 and gas discharge tube 137 are connected in parallel between one end of the inductor 133 and ground. The circuitry on the PCB 105 needs surge protection and lightning protection which is provided in part by the flat inductors 121 and 131.

Figure 2:
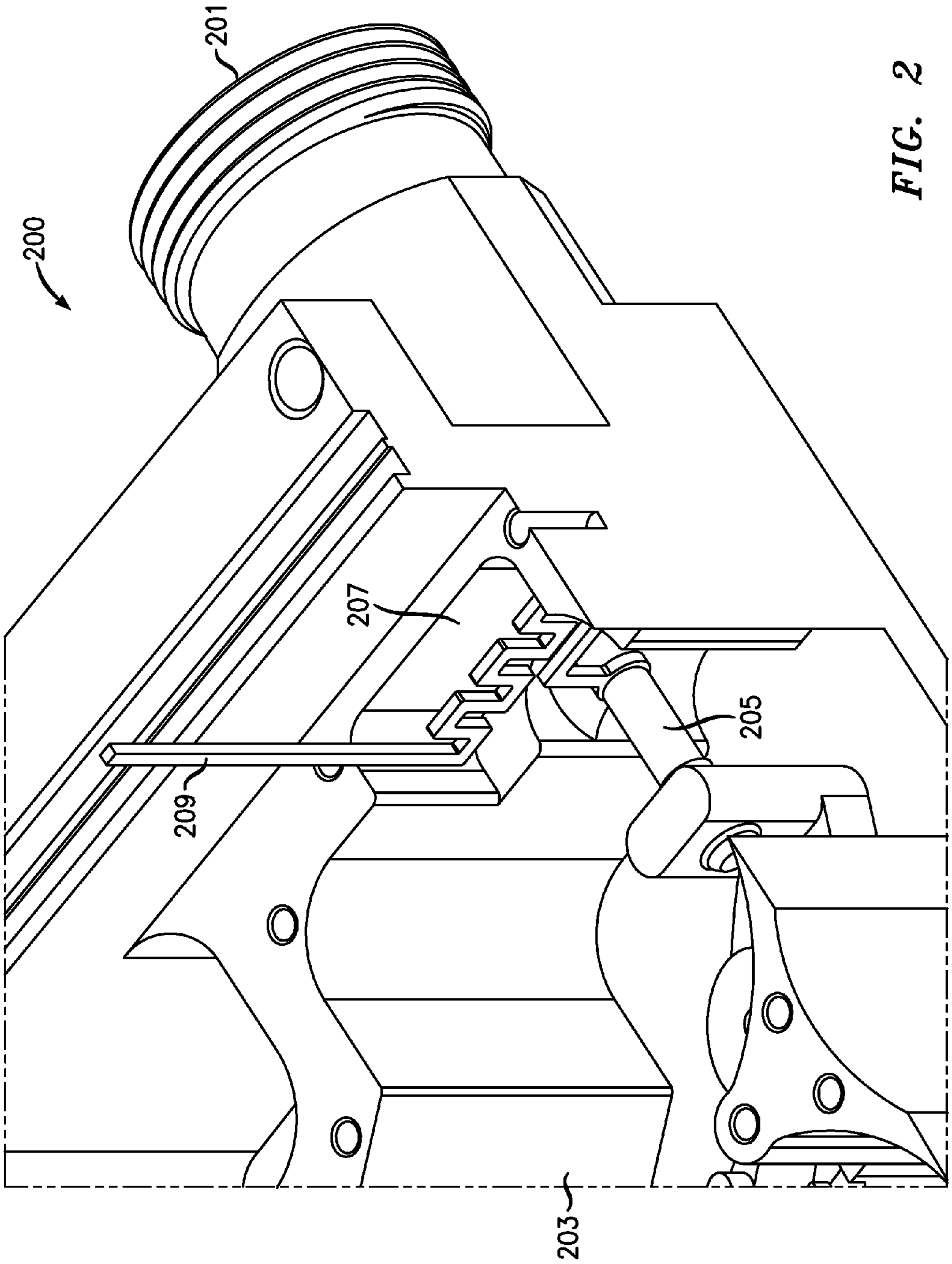
FIG. 2 illustrates an exemplary base station element that includes an AC suppression filter including an inductor in a cavity.

FIG. 2 illustrates an exemplary base station element that includes an AC suppression filter including an inductor in a cavity. Base station element 200 may be an RF filter that may include a port 201, a cavity 203, a tap pin 205, and a flat inductor 207. Base station element 200 may also include a printed circuit board (PCB) (not shown) that includes other electrical components. The AC suppression filter may protect the PCB from lighting or other high power surges. The tap pin 205 and the flat inductor 207 may connect to one or more portions of the PCB. The flat inductor 207 may include a PCB connector 209 that may connect to the PCB. The PCB connector 209 may include a snap in connector to connect to the PCB, so that soldering of the connection is not necessary.

The cavity 203 may include free space within the base station element 200. Cavity 203 may be designed to include a cavity filter. In some embodiments, the base station element 200 may include multiple cavities 203 that may include one or more flat inductors 207. In some embodiments, the cavity 203 may include multiple flat inductors 207. This may occur, for example, when the AC-suppression filter uses multiple flat inductors 207. The configuration of the cavity 203, including its volume and shape, may be based, for example, on the components housed within the cavity and the desired filter characteristics. For example, in the illustrative embodiment, the tap pin 205 and the flat inductor 207 may be included within the cavity 203.

Tap pin 205 may be hardware in the cavity 203 that connects the inductor to other components in the AC-suppression filter. For example, the tap pin 205 may act as an electrical port to connect the filter to other components in the base station. In such instances, the tap pin 205 may receive the signal and transmit the signal to the inductor 207. Alternatively, the tap pin 205 may act as an output port and may transmit the filtered signal from the inductor 207 to other components in the base station element 200.

Figure 3:
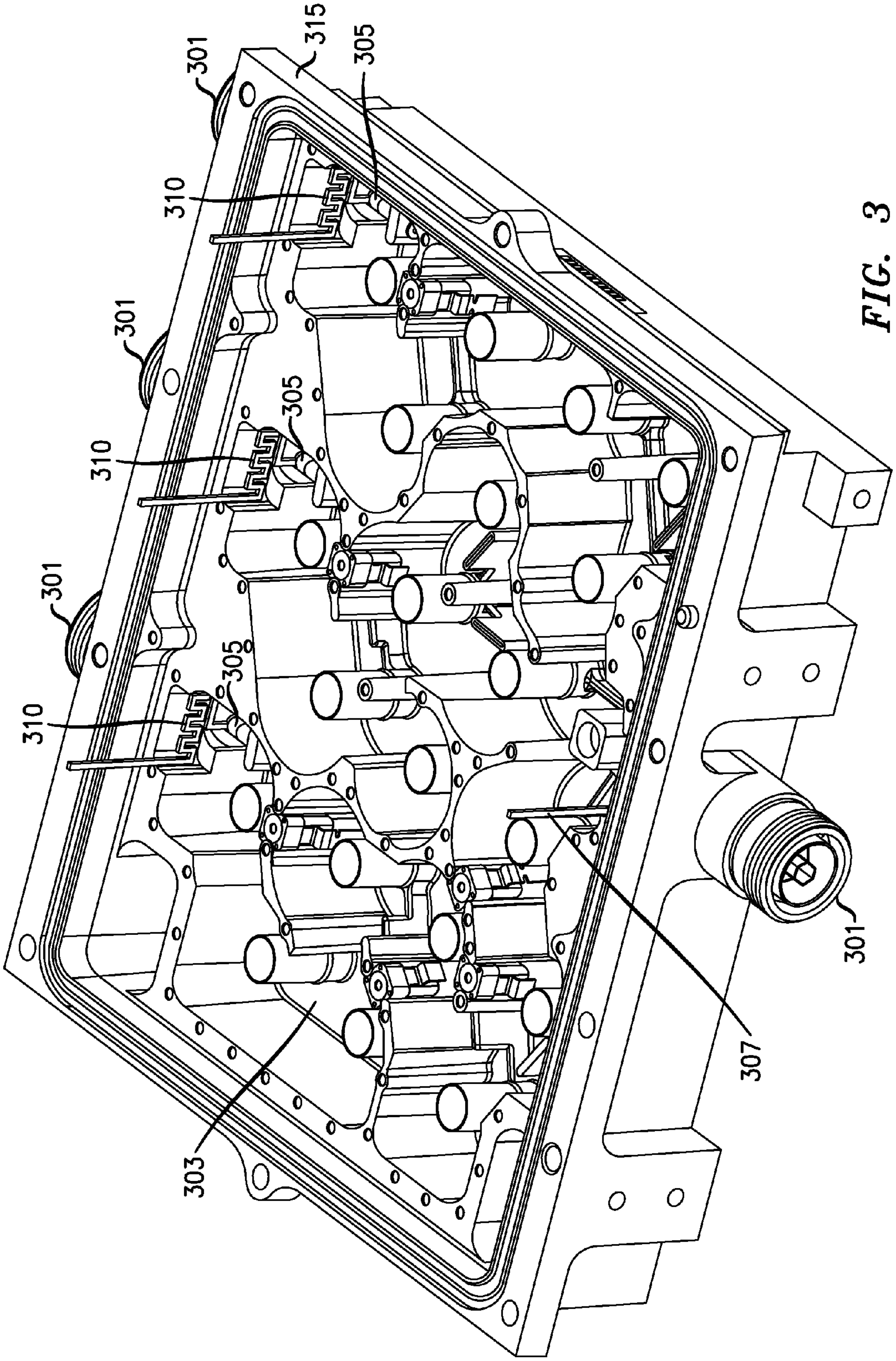
FIG. 3 illustrates another view of an exemplary base station element that includes an AC suppression filter including an inductor in a cavity.

FIG. 3 illustrates another view of an exemplary base station element that includes an AC suppression filter including an inductor in a cavity. The base station element 300 may be a three way splitter/combiner and filter. The base station element 300 may include ports 301, cavity 303, tap pins 305, flat inductors 307, and a housing 315. These structures have the same function as those defined above with respect to FIG. 2.

Figure 4:
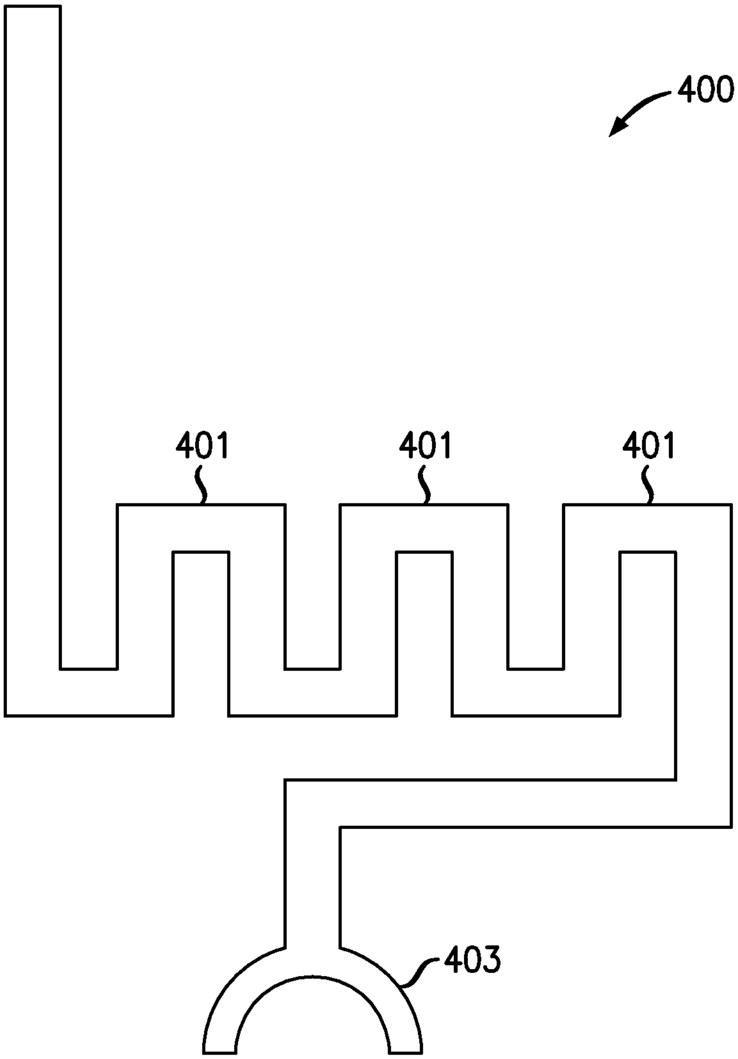
FIG. 4 illustrates an embodiment of a flat inductor 400.

FIG. 4 illustrates an embodiment of a flat inductor 400. The flat inductor 400 may be the same as the flat inductor 207. Flat inductor 400 may include one or more hairpin turns 401, with the number of turns, width, and length of the flat inductor 400 determining its inductance. A person of skill in the art would be aware of ways to configure the flat inductor 400. The flat inductor 400 may also include a snap on connector 403. The snap on connector 403 is shown as semi-circular so as to snap onto a cylindrical tap pin. The snap on connector 403 may have other shapes selected to be able to snap onto the tap pin which may have various shapes. The snap on connector eliminates the need for soldering the connection between the flat inductor 400 and the tap pin.

The flat inductor 400 may be formed by photo-etching or cutting a plate to result in the shape of the flat inductor. Such manufacturing technique allows for a precise and repeatable flat inductor that will have a small variation in its characteristics. Further, the flat inductor has a benefit over a traditional coiled inductor. The coiled inductor is more difficult to wind consistently to result in repeatable inductor characteristics. Also, the coiled structure is not as strong and rigid as the structure of the flat inductor 400.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

We claim:

1. A base station element comprising:
- a housing forming a cavity; and
- a filter that is configured to receive a signal, suppress an alternating-current (AC) portion of the signal, and pass a direct-current (DC) portion of the signal, the filter comprising:
  - a flat inductor disposed inside the cavity, and
  - a cylindrical tap pin disposed inside the cavity and connected to a first end of the flat inductor.

2. The base station element of claim 1, wherein the filter further comprises:
- a printed circuit board (PCB) attached to a second end of the flat inductor.

3. The base station element of claim 2, wherein the flat inductor further comprises:
- a snap in connector connected to the second end, wherein the snap in connector is attached to a socket in the PCB.

4. The base station element of claim 1, wherein the flat inductor further comprises:
- a snap on connector connected to the first end.

5. The base station element of claim 4, wherein the snap on connector is semi-circular and the snap on connector is attached to the side of the tap pin.

6. The base station element of claim 1, wherein the flat inductor includes at least one hairpin turn.

7. The base station element of claim 1, wherein the flat inductor is formed using photo-etching.

8. The base station element of claim 1, wherein the flat inductor comprises a single material.

9. The base station element of claim 1, wherein the base station element operates at a power above 200 W.

10. The base station element of claim 1, wherein the base station element comprises an auto-transformer.

11. A method of suppressing an alternating-current (AC) portion of a signal, the method comprising:
- providing a base station element comprising a housing forming a cavity;
- providing a filter comprising a flat inductor disposed inside the cavity, and a cylindrical tap pin disposed inside the cavity and connected to a first end of the flat inductor;
- receiving, by the filter, the signal;
- suppressing, by the filter, the AC portion of the signal; and
- passing, by the filter, a direct-current (DC) portion of the signal.

12. The method of claim 11, further comprising:
- attaching a printed circuit board (PCB) to a second end of the flat inductor.

13. The method of claim 12, further comprising:
- connecting a snap in connector to the second end, wherein the snap in connector is attached to a socket in the PCB.

14. The method of claim 11, further comprising:
- connecting a snap on connector to the first end of the flat inductor.

15. The method of claim 14, wherein the snap on connector is semi-circular and the snap on connector is attached to the side of the tap pin.

16. The method of claim 11, wherein the flat inductor includes at least one hairpin turn.

17. The method of claim 11, further comprising:
- producing the flat inductor through photo-etching.

18. The method of claim 11, wherein the flat inductor comprises a single material.

19. The method of claim 11, wherein the base station operates at a power above 200 W.

20. The method of claim 11, wherein the base station comprises an auto-transformer.

* * * * *